United States Patent [19]
Eckardt

[11] B 3,991,037
[45] Nov. 9, 1976

[54] PROCESS FOR PREPARING FILAMENTS, FIBERS AND SHEETS OF AROMATIC POLYAMIDES

[75] Inventor: Peter Eckardt, Hofheim, Taunus, Germany

[73] Assignee: Hoechst Aktiengesellschaft, Frankfurt am Main, Germany

[22] Filed: Mar. 14, 1974

[21] Appl. No.: 451,308

[44] Published under the second Trial Voluntary Protest Program on February 17, 1976 as document No. B 451,308.

[30] Foreign Application Priority Data
Mar. 17, 1973 Germany............................ 2313308

[52] U.S. Cl............................. 260/78 S; 260/78 R; 260/78 SC; 264/184
[51] Int. Cl.²......................................... C08G 69/44
[58] Field of Search............ 260/78 S, 78 SC, 78 A; 264/184

[56] References Cited
UNITED STATES PATENTS

| | | | |
|---|---|---|---|
| 3,063,966 | 11/1962 | Kwolek et al. | 260/78 |
| 3,079,219 | 2/1963 | King | 264/184 |
| 3,300,450 | 1/1967 | Clay | 264/344 |
| 3,642,706 | 2/1972 | Morgan | 264/184 |
| 3,767,756 | 10/1973 | Blades | 264/184 |
| 3,775,361 | 11/1973 | Jensen | 264/184 |
| 3,796,693 | 3/1974 | Morgan et al. | 264/184 |
| 3,819,587 | 6/1974 | Kwolek | 260/30.2 |

FOREIGN PATENTS OR APPLICATIONS

| | | | |
|---|---|---|---|
| 1,420,681 | 10/1968 | Germany | 260/78 |

*Primary Examiner*—Jay H. Woo
*Attorney, Agent, or Firm*—Curtis, Morris & Safford

[57] ABSTRACT

Limpid solutions suitable for making filaments and sheets of mostly aromatic polyamides are obtained by precondensation of the initial materials up to a conversion rate of from 80 to 98% in a solvent, neutralization with ammonia, separation of the insoluble ammonium halide, addition of an inorganic base, evacuation of the ammonia set free, subsequent after condensation and neutralization of the hydrogen halide newly formed.

The spinning solutions prepared according to this process are stable and limpid and are excellently suitable for the preparation of shaped articles.

3 Claims, No Drawings

PROCESS FOR PREPARING FILAMENTS, FIBERS AND SHEETS OF AROMATIC POLYAMIDES

The present invention relates to a process for preparing stable and limpid spinning solutions which are exceptionally well suited for the manufacture of shaped articles on the basis of aromatic polyamides.

German "Offenlegungsschrift" No. 1,420,681, for example, describes the preparation of filaments and fibers on the basis of aromatic polyamides, i.e. polymers the amide groups of which are linked directly to the aromatic nucleus. The products obtained excel in having a special resistance to high temperatures and exceptional flame-retardant properties. The aforesaid patent specification cites several processes for the preparation of spinning solutions based on aromatic polyamides.

Spinning solutions may be obtained, for example, by reaction of m-phenylene-diamine, dissolved in N,N-dimethylacetamide (DMA) and isophthalic acid dichloride. The hydrogen chloride formed during this reaction is first bound by the solvent and subsequently neutralized, for example by adding corresponding quantities of calcium hydroxide. Limpid polymer solutions are obtained containing approximately 18 % of polymers and from 8 to 9 % of calcium chloride. When using this solution for producing shaped articles, a series of difficulties are encountered: The high proportion of calcium chloride and the resulting low polymer proportion in the solution makes this process relatively expensive and requires some efforts for the spinning process, particularly for washing the salt out of the filaments. The washing should desirably be performed to the highest possible perfection, since a chloride content of 0.2 % reduces drastically the temperature stability of the filaments. The presence of large quantities of calcium chloride in the solution increases considerably the viscosity, thus making the necessary filtration of spinning solutions more difficult.

The same Offenlegungsschrift also describes a modified two-step-process for the preparation of spinning solutions containing from 0.5 to 2 % calcium chloride. The reaction of m-phenylene-diamine, dissolved in DMA, with the isophthalic acid dichloride is interrupted upon addition of a certain percentage (usually between 80 and 98 %) of the acid chloride, and hydrogen chloride formed thus far is neutralized with ammonia. The ammonium chloride formed and precipitated is subsequently removed from the precondensate solution by means of filtration or centrifugation. The remaining quantity of isophthalic acid dichloride is then added until a highly viscous polymer solution is obtained. The hydrogen chloride formed during the second condensation step is neutralized by calcium hydroxide to yield calcium chloride. The spinning solution has to contain a minor quantity of e.g. calcium chloride to prevent the solutions from gelatinizing.

Compared to the one-step process first described, the latter two-step method offers some advantages: the spinning solutions may contain a larger quantity of polymer (e.g. 20 to 25 %) — at the same viscosity — and, moreover, upon spinning it is much easier to remove the salt from the filaments by washing. However, this two-step condensation presents the inconvenience that the solutions obtained are opaque to turbid. This turbidity cannot be eliminated by filtration and clogs the spinning nozzles with impurities responsible for frequent breakage of the filaments.

The subject of the present invention is the preparation of spinning solutions of aromatic polyamides according to a two-step process which yields perfectly limpid spinning solutions suitable for dry spinning or wet spinning processes to yield filaments, fibers or sheets. It has been found that the turbidities of the spinning solutions occurring during the two-step process performed according to the state of the art are produced by extremely fine crystals of ammonium chloride. The ammonium chloride involved is the fraction that initially remains in the dissolved state upon separating the fraction of the precondensate solution insoluble in DMA, and the initially dissolved fraction of ammonium chloride subsequently separates as fine crystals during the second condensing step in which the viscosity of the polymer solution considerably increases. These crystals having a diameter of up to 40 $\mu$m are responsible for the turbidities observed and the clogged filters and nozzles. It has been found that the spinning solutions according to the state of the art contain from 0.7 to 0.9 % of ammonium chloride.

Simple methods do not suffice for eliminating the subsequently precipitated ammonium chloride. As already described, the crystals cannot be filtered off the highly viscous spinning solution. The addition of solvents or solubilizers is effective only when adding large quantities. These additions, however, impair considerably the spinning properties of the solutions. Theoretically, the ammonium chloride could be removed by precipitation of the polymer produced, for example, by means of water, drying of the polymerization product and renewed dissolution. However, this method is extremely cumbersome and often leads to a decline of the spinning quality due to unavoidable impurities which may penetrate into the products to be processed while undergoing these supplementary operational treatments.

Addition of water to the reaction solution should be avoided. Swiss Patent No. 426,262 states, for example, that the obtention of high-molecular polyamides is possible only if the medium does not contain more than 0.3 wt.% of water. Keeping within this limit, there is a reasonable chance to avoid the formation of by-products from the acid chlorides used. Tests of our own confirmed these statements. Upon reacting, for example, m-phenylene-diamine with isophthalic acid dichloride in dimethylacetamide, in the presence of 0.4 wt.% of water, a low-molecular polycondensation product is obtained, the inherent viscosity of which was about 0.9. It was impossible to spin the solution. The inherent viscosity of a polycondensation product is calculated on basis of the relative viscosity (measured at 25°C on a solution of 0.5 g of polymer in 100 ml of concentrated sulfuric acid) according to the equation:

$$\eta \text{ inh} = \frac{\ln \eta_{rel}}{c},$$

wherein $c$ is the number of grams of polymer in 100 ml of solution.

Surprisingly, it has been found that it is possible to remove the 0.7 to 0.9 wt.% of ammonium chloride contained in dissolved state in the limpid filtrate of the precondensate solution by addition of an inorganic base. The reaction is well known in chemistry as setting free a volatile base from its salt, wherein use is made of bases having chlorides which are soluble in dimethylacetamide. Especially suitable for this purpose are the oxides and hydroxides of lithium and of calcium: $Li_2O$, LiOH, CaO and $Ca(OH)_2$, preferably of calcium compounds. The chlorides formed during this reaction (LiCl or $CaCl_2$) stabilize the finished polymer solution. It has been found that these compounds do not impair the final condensation. The greatest surprise was, however, that the quantity of water formed during this reaction also does not impair the formation of high polymers.

The ammonia set free is blown out by introducing nitrogen into the low-molecular precondensate solution of the aromatic polyamide. Since ammonia can interfere with the condensation process, the gas has to be evacuated completely to ensure formation of sufficiently long chains. The evacuation of ammonium may be accelerated by operating under reduced pressure (e.g. 100 to 300 torr). When adding in the process according to the invention a quantity of calcium hydroxide equivalent to 0.9 wt.% of ammonium chloride, it is easy to attain a polymer viscosity of $\eta_{inh}$ of 1.41, as described in example 1. In the reaction of the calcium hydroxide with the ammonium chloride present in the solution, 0.38 % of water is formed. As the solvent used contained 0.03 % of water, the total content of water is thus 0.41 % for example 1. As described, it was found that the final condensation could be performed despite the presence of this quantity of water. Limpid spinning solutions were obtained which could be processed without presenting any spinning troubles.

Any temperature may be chosen for reacting the condensate solution with the inorganic bases. However, in view of the low reaction speed, the temperature should not drop below 20°C, preferably it is in the range of from 25° to 60°C.

Prior to adding the bases, they should be ground to finely divided form to speed up the reaction sufficiently. The reaction time should be at least 10 minutes, preferably from 15 to 30 minutes, though any longer period does not impede the process.

It is also possible to add the bases after the final condensation and to remove the ammonia subsequently. However, the solutions to be treated are then highly viscous, and hence the reaction after the final condensation presents great technological problems and requires a prolonged period for removing the ammonia. For that reason, this latter process version is less desirable.

Suitable reaction components for the preparation of aromatic polyamides are, for example, m- and p-aminobenzoic acid halide-hydrohalides or their derivatives and diamine components capable of reacting with dicarboxylic acid halides. As examples of aromatic diamines are cited: m- and p-phenylene-diamine, benzidine, 4,4'-diaminodiphenylmethane, 4,4'-diaminostilbene, 4,4'-diaminophenyl ether, 4,4'-diaminodiphenylsulfone and diaminonaphthalines having amino groups neither in ortho- nor in peri-position. These diamines may carry further substituents such as lower alkyl groups, lower alkoxy groups, halogen atoms, nitro and carbalkoxy groups. A preferred aromatic diamine is m-phenylene-diamine.

Suitable aromatic dicarboxylic acid halides are, for example, isophthaloyl chloride and terephthaloyl chloride, the corresponding bromides and polynuclear compounds having acid halide groups in m- or p-position, such as 4,4'-diphenyldicarboxylic acid chloride, 4,4'-oxydibenzoyl chloride, 4,4'-sulfonyl-dibenzoyl chloride. In addition to these simple dicarboxylic acid halides there may be used halides which carry lower alkyl groups, lower alkoxy groups, halogen atoms, nitro groups, phenyl groups and carbalkoxy groups and others. Isophthaloyl chloride is cited as a preferred dicarboxylic acid halide. The aromatic polyamides may also contain minor quantities of aliphatic and/or cycloaliphatic dicarboxylic acid units. Suitable components in this respect are, for example, adipic acid chloride, sebacic acid chloride, fumaric acid chloride and hexahydroterephthalic acid chloride. The copolyamide-phosphonamides described in German Offenlegungsschrift No. 2,062,774 are also appropriate for preparing limpid stable polymer solutions according to the process of the invention from which filaments, fibers and sheets can be obtained.

The following examples illustrate the invention, the parts being by weight.

EXAMPLE 1

156.2 parts of m-phenylene-diamine are dissolved in 1,275 parts of dimethylacetamide and mixed slowly with 278.6 parts of isophthalic acid dichloride (95 % of the total quantity) under nitrogen at a temperature from 0° to −10°C. The addition being terminated, gaseous ammonia is introduced for neutralizing the hydrogen chloride being formed during the reaction. The isolated ammonium chloride is separated by means of a pressure filter. The perfectly limpid precondensate solution of low viscosity is subsequently mixed with 11.0 parts of calcium hydroxide (stoichiometric quantity for 0.9 % of dissolved ammonium chloride). While stirring vigorously, a nitrogen current (200 ltr/h is blown into the solution at room temperature. The evacuation of the ammonia takes 30 minutes. The addition of a small quantity of dimethylacetamide hydrochloride adjusts the pH of the solution to 6.5. The dimethylacetamide used contains 0.03 % of water, the total content of water after the reaction with calcium hydroxide therefore amounts to 0.41 %. The condensation is completed by slow-paced addition of 14.5 parts of isophthaloyl chloride to the precondensate solution. The hydrogen chloride formed during the final condensation is neutralized by 5.5 parts of calcium hydroxide. The finished solution contains 21 % of poly-m-phenylene-isophthalamide and 1 % of calcium chloride, is perfectly limpid and survives several months of storage without gelation. The inherent viscosity of the polycondensate produced amounts to $\eta_{inh} = 1.41$. Analyzing for ammonium chloride, a content of less than 0.1 % was found. The spinning solution obtained may be submitted to known dry-spinning or wet-spinning processes and no clogging is observed either at the filters nor at the nozzles.

EXAMPLE 2

159.1 parts of m-phenylene-diamine, dissolved in 1,300 parts of DMA, are reacted with 283.8 parts of isophthaloyl chloride as described in example 1. After completion of the filtration, the filtrate is mixed with 6.5 parts of calcium oxide (corresponding to a quantity of 0.7 % of ammonium chloride) and at 50°C nitrogen is blown into the solution for 20 minutes. During this period of time the apparatus is evacuated to approximately 300 torr. The elimination of the ammonia is performed to such perfection that no addition of any dimethylacetamide hydrochloride is required. The remaining 14.9 parts of isophthaloyl chloride are added in small portions at 30°C so as to produce a highly viscous limpid solution. Another addition of 5.7 grams of calcium hydroxide acts as a neutralizer. The limpid solution preservable for months contains 21 % of poly-m-phenylene-isophthalamide having an inherent viscosity of 1.56 and 1 % of calcium chloride. The analysis for ammonium chloride shows a value of 0.19 %.

EXAMPLE 3

This example describes the preparation of a limpid spinning solution of a copolyamide-phosphonamide: 162.8 parts of m-phenylene-diamine are melted under nitrogen and 37.8 parts (12.5 mole %) of cyclohexane-phosphonic acid dichloride are added dropwise while stirring, in such a way that the temperature of the reaction mixture is maintained between 65° and 80°C. The reaction product is dissolved in 1,415 parts of dimethylacetamide. The condensation with 236.8 parts (77.5 mole %) of isophthaloyl chloride, the neutralization and the filtration are performed as per the description given for example 1. 7.4 grams (equivalent to 0.6 % of ammonium chloride) of calcium hydroxide are added to the limpid filtrate, while nitrogen is blown in for 30 minutes at temperatures from 33° to 36°C. The condensation is completed with 30.6 parts (10 mole %) of isoophthaloyl chloride. A limpid, highly viscous spinning solution is obtained of a copolyamide of poly-m-phenylene-isophthalamide with built-in units of cyclohexanephosphonic acid of an inherent viscosity of 1.74 (measured in dimethylacetamide containing 2 % of calcium chloride, concentration 0.5 gram per 100 ml of solvent). This solution is preservable for months, too. It contains 20 % of the polyamide and 2 % of calcium chloride as well as 0.21 % of ammonium chloride.

What is claimed is:
1. In a process for the preparation of filaments, fibers and sheets of essentially aromatic polyamides comprising the steps of pre-condensing aromatic diamines and dicarboxylic acid halides to a conversion of from 80 to 98% in an amide-type solvent, neutralizing with ammonia the hydrogen halide formed in said pre-condensation step to form an ammonium halide of which a portion is soluble in said amide-type solvent, separating the insoluble portion of the ammonium halide formed in said neutralization step, adding further quantities of dicarboxylic acid halide to the reaction mixture and post-condensing them to complete the condensation reaction, neutralizing the hydrogen halide formed in said post-condensation step and spinning the resulting solution; the improvement which comprises adding to the reaction solution after separation of the insoluble portion of said ammonium halide and prior to said post-condensation step an inorganic base, the halide of which is soluble in said amide-type solvent, causing said added inorganic base to react with the dissolved portion of said ammonium halide to release ammonia, removing the ammonia thus set free and thereafter carrying out said postcondensation step until the desired degree of polymerization is obtained.

2. A process according to claim 1 wherein said inorganic base is selected from calcium oxide, calcium hydroxide, lithium oxide, lithium hydroxide and mixtures thereof.

3. A process according to claim 1 wherein the temperature of the reaction solution during reaction of the inorganic base with the dissolved portion of the ammonium halide is from 25° to 60°C.

* * * * *